Figure 1:
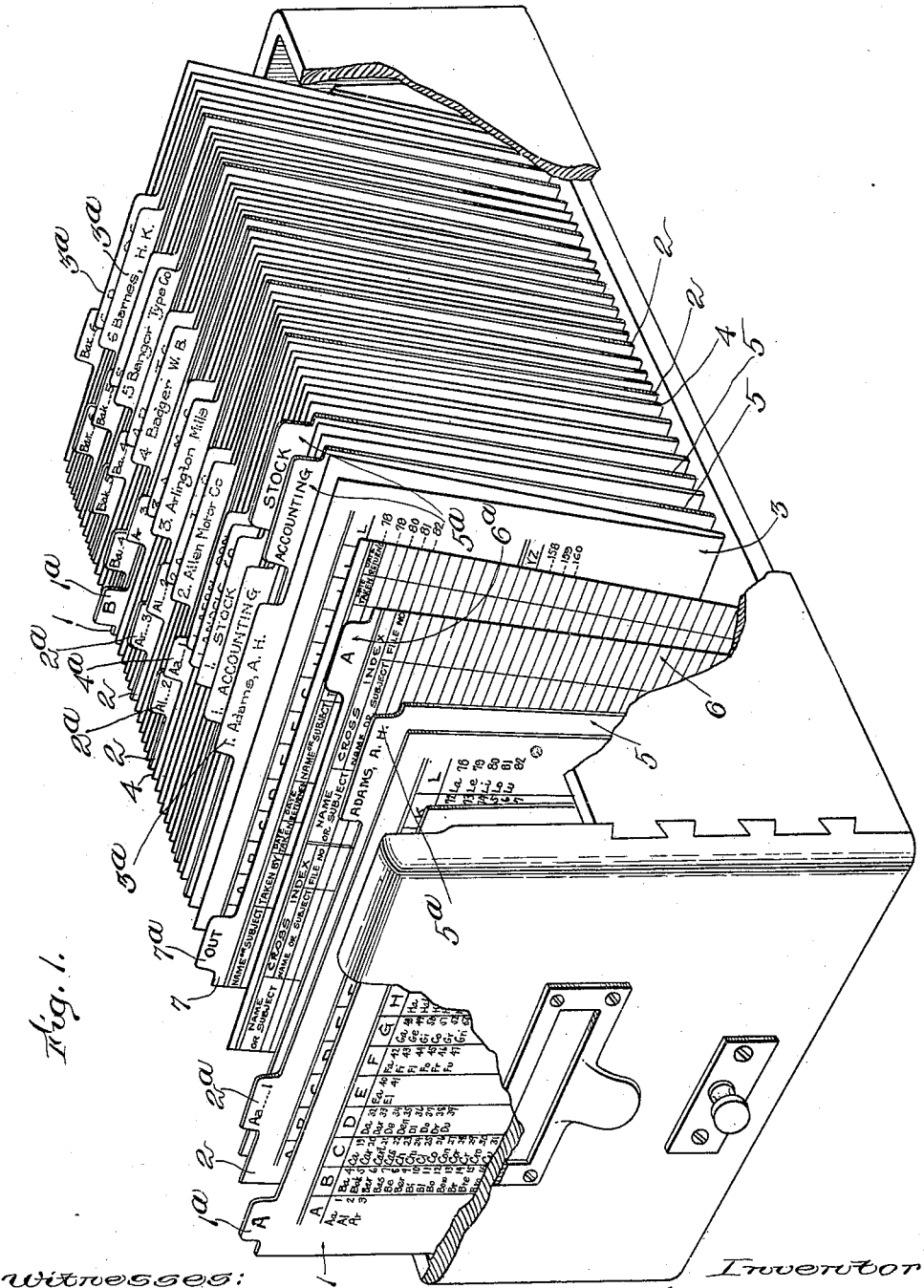

E. A. DUNN.
FILING SYSTEM.
APPLICATION FILED APR. 5, 1910.

982,708.

Patented Jan. 24, 1911.
4 SHEETS—SHEET 1.

Witnesses:
P. W. Pezzetti
E. Batchelder

Inventor:
E. A. Dunn
by Wright, Brown, Quinby & May
Attorneys.

E. A. DUNN.
FILING SYSTEM.
APPLICATION FILED APR. 5, 1910.

982,708.

Patented Jan. 24, 1911.

4 SHEETS—SHEET 2.

Tabs: 1a  2a  4a  3a  5a

A | Aa.....1 | Aa.....1 | 1. Adams, A. H. | Adams, A. H.

| A | B | C | D | E | F | G | H | I | J | K | L |
|---|---|---|---|---|---|---|---|---|---|---|---|
| Aa....1 | Ba....4 | Ca....19 | Da....32 | Ea....40 | Fa....42 | Ga....48 | Ha....54 | Ia....67 | Ja....68 | Ka....72 | La....78 |
| Al....2 | Bak....5 | Car....20 | Dar....33 | El....41 | Fi....43 | Ge....49 | Hal....55 | | Je....69 | Ke....73 | Le....79 |
| Ar....3 | Bar....6 | Cart....21 | De....34 | | Fl....44 | Gi....50 | Han....56 | | Jo....70 | Kl....74 | Li....80 |
| | Ba....7 | Cas....22 | Den....35 | | Fo....45 | Go....51 | Har....57 | | Jon....71 | Kn....75 | Lo....81 |
| | Be....8 | Ch....23 | Di....36 | | Fr....46 | Gr....52 | Hat....58 | | | Ko....76 | Lu....82 |
| | Ber....9 | Chi....24 | Do....37 | | Fu....47 | Gri....53 | He....59 | | | Kr....77 | |
| | Bi....10 | Cl....25 | Dr....38 | | | | Hen....60 | | | | |
| | Bl....11 | Co....26 | Du....39 | | | | Her....61 | | | | |
| | Bo....12 | Con....27 | | | | | Hi....62 | | | | |
| | Bow....13 | Cor....28 | | | | | Ho....63 | | | | |
| | Br....14 | Cr....29 | | | | | Hop....64 | | | | |
| | Bre....15 | Cro....30 | | | | | Hor....65 | | | | |
| | Bro....16 | Cu....31 | | | | | Hu....66 | | | | |
| | Bu....17 | | | | | | | | | | |
| | Bur....18 | | | | | | | | | | |

| M | N | O | P | Q | R | S | T | U | V | W | XYZ |
|---|---|---|---|---|---|---|---|---|---|---|---|
| Ma....83 | Na....97 | Oa....101 | Pa....103 | Qa....111 | Ra....112 | Sa....121 | Ta....138 | Ua....144 | Va....145 | Wa....147 | X....158 |
| Mad....84 | Ne....98 | Or....102 | Par....104 | | Re....113 | Sch....122 | Te....139 | | Vi....146 | Wal....148 | Y....159 |
| Mar....85 | Ni....99 | | Pe....105 | | Rel....114 | Schm....123 | Th....140 | | | War....149 | Z....160 |
| Mas....86 | No....100 | | Pet....106 | | Ri....115 | Schu....124 | Ti....141 | | | We....150 | |
| Mc....87 | | | Ph....107 | | Rii....116 | Se....125 | To....142 | | | Wel....151 | |
| McD....88 | | | Pi....108 | | Ro....117 | Sh....126 | Tu....143 | | | Wh....152 | |
| McI....89 | | | Po....109 | | Rod....118 | She....127 | | | | Whi....153 | |
| McM....90 | | | Pr....110 | | Ros....119 | Sl....128 | | | | Wl....154 | |
| Me....91 | | | | | Ru....120 | Sm....129 | | | | Wils....155 | |
| Mi....92 | | | | | | Sn....130 | | | | Wo....156 | |
| Mo....93 | | | | | | So....131 | | | | Wr....157 | |
| Mor....94 | | | | | | Sp....132 | | | | | |
| Mu....95 | | | | | | St....133 | | | | | |
| Mur....96 | | | | | | Ste....134 | | | | | |
| | | | | | | Sta....135 | | | | | |
| | | | | | | Stu....136 | | | | | |
| | | | | | | Su....137 | | | | | |

Fig. 2.

Witnesses:
P. W. Pezzetti
E. Batchelder

Inventor:
E. A. Dunn
by Wright, Brown, Quinby & May
Attorneys.

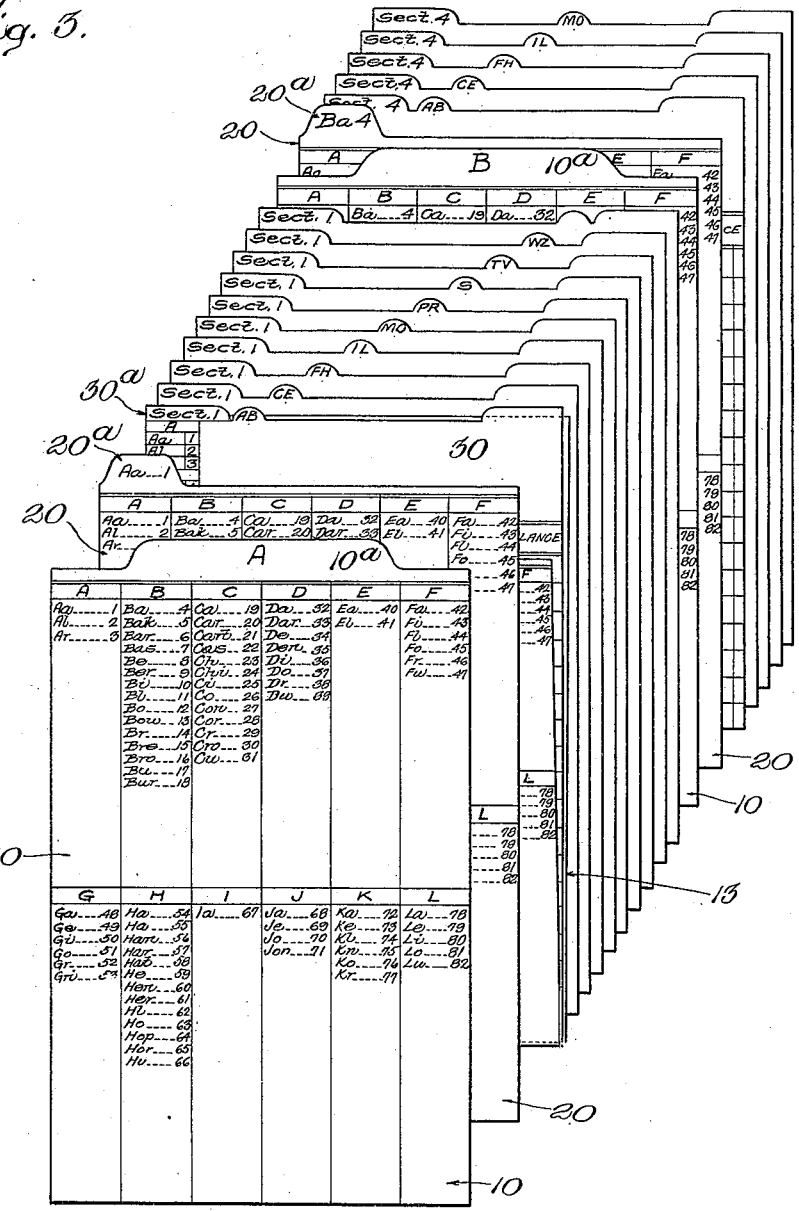

Figures 4, 5:
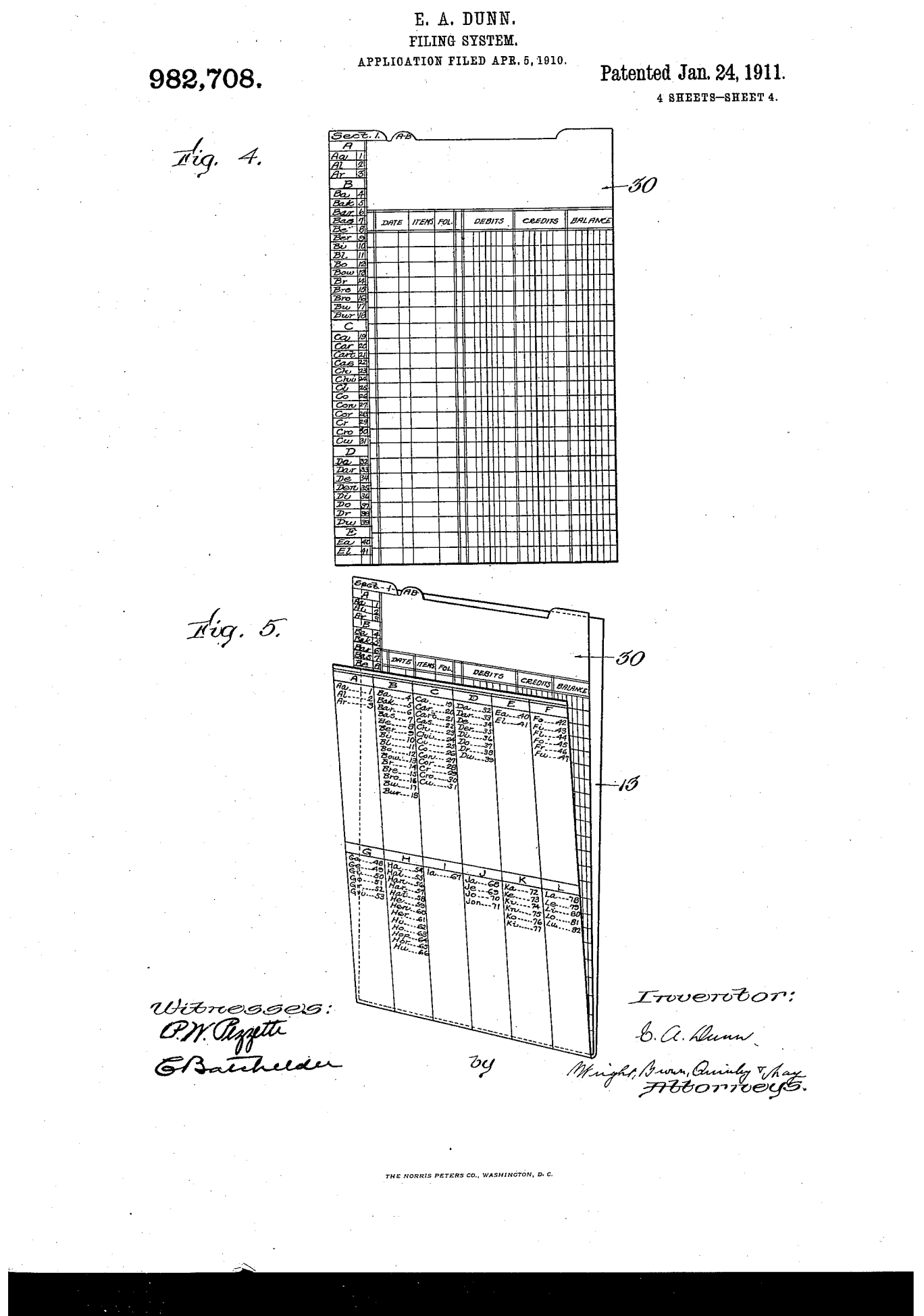

E. A. DUNN.
FILING SYSTEM.
APPLICATION FILED APR. 5, 1910.

982,708.

Patented Jan. 24, 1911.

Witnesses:

Inventor:
E. A. Dunn
by Wright, Brown, Quinby & Hay
Attorneys.

UNITED STATES PATENT OFFICE.

EDWARD A. DUNN, OF NEWTON, MASSACHUSETTS.

FILING SYSTEM.

982,708. Specification of Letters Patent. Patented Jan. 24, 1911.

Application filed April 5, 1910. Serial No. 553,537.

*To all whom it may concern:*

Be it known that I, EDWARD A. DUNN, of Newton, in the county of Middlesex and State of Massachusetts, have invented certain new and useful Improvements in Filing Systems, of which the following is a specification.

This invention relates to filing systems of a type employing cards which are usually arranged in one or more boxes or drawers, for containing correspondence, cost cards, bills, invoices or other loose papers to which reference has to be made from time to time.

One of the objects of this invention is to provide means whereby unnecessary details may be eliminated, especially by avoiding necessity for reference to a separate index of any form or type whatever.

A further object of the invention is to provide means combining alphabetical and numerical arrangements so that the alphabetical arrangement may serve as a check for the numerical, and the numerical arrangement will serve to check the alphabetical.

A further object is to provide a relative arrangement of indications carried by the tabs or projections to avoid possibility of error in filing.

To these ends my invention consists in the system substantially as hereinafter described and claimed.

Of the accompanying drawings:—Figure 1 is a perspective view of a sufficient number of a set of members to illustrate my invention, the same being arranged in a drawer, portions of which are broken out. Fig. 2 is a face view of one of the main guides, and showing the tabs of other members behind it. Fig. 3 is a view similar to Fig. 1, without showing a box or casing for the members, and said members being arranged for use as a numerical card ledger. Fig. 4 is a face view of one of the members shown in Fig. 3. Fig. 5 is a perspective view of another member shown in Fig. 3.

Referring first to Figs. 1 and 2, 1 indicates the main guides having tabs or projections 1ª which bear the letters of the alphabet. There may be any number of these guides comprising a set, the tabs being printed from A to Z. In Fig. 1 there are two of such main guides indicated; but it is to be understood that a complete set might include twenty-four of such guides, X Y Z being on the last one, and that they will be distributed through as many boxes or drawers as are required to carry the entire set.

Each main guide 1 is printed as best indicated in Fig. 2 of the drawings, said printing comprising 160 sub-divisions of the complete alphabet. Each sub-division has its own number; for instance Aa belongs in division 1, Al belongs in division 2; and Z belongs in division 160. I do not limit myself, of course, to this particular number of sub-divisions. There might be a greater or lesser number as 25 sub-divisions, or 40, or 80, or 320, or 640, or 960. It is essential that the guides shall all be printed alike and carry all of the sub-divisions of the complete alphabet, and that the printing shall be such that every division of the alphabet, no matter how arbitrary that division shall be made shall have its own numerical indication so that, no matter where the searcher may look throughout the set, there will be immediately accessible a means for him or her to determine what number belongs to a particular sub-division of the alphabet. The same is, of course, also useful whenever a letter is to be filed according to the name of the writer; for instance, if a letter has been received from a person by the name of Smith, it would quickly be determined that that letter is to be filed in division 129. These guides, and in fact all of the guides, cards, and folders hereinafter described, may be of any suitable stock. While I do not limit myself to the particular location of the tabs at the upper edges of the guides, I prefer that the tabs 1ª of the guides 1 shall be at the extreme left which is known as first position. Other guides 2 are employed, each for one of the arbitrary sub-divisions of the alphabet, Aa, Al, Ar, etc., the tabs being printed in the manner just mentioned. Each of the guides 2 is printed just the same as the guides 1, and said guides are preferably cut so that their tabs 2ª are in what is known as second position, by which I mean that when the various cards are arranged in a drawer, the tabs 2ª will appear next to the right of the tabs 1ª, this being best indicated in Fig. 2.

Folders 3 which I shall refer to as the permanent folders because they will be employed for active correspondence or subjects, are provided with tabs 3ª which are preferably located in what I refer to as the fourth position, as best illustrated in Fig. 2. The tabs 3ª are not printed, the letter being put on according to the wish of the user, but the front leaves of each of the folders 3 are all printed correspondingly with the faces of the guides 1 and 2, that is have the same complete alphabetical sub-divisions indicated by the same numerals. Owing to the fact that the folders 3 as well as the guides 1 and 2 all have uniform sub-divisions of the complete alphabet, each of such members provides a reference to guide the user to enable him to instantly find the proper number for his next filing or examination. In other words, each folder where he is working can itself be referred to for information concerning the next location to be found, if he should wish to dispense with the guides 1 or 2, and consequently the complete alphabetical and numerical sub-divisions of the folders constitute ever ready guides for reference. When one of these folders has its tab written upon by the user with the name of a person or the title of a subject, the numeral to fit the portion of the alphabet to which the subject relates will also be applied at the left of the tab 3ª, the purpose of which is as follows;—The tabs 2ª have their numerals at the right. Since the numeral of the tab 3ª is at the left, said numerals will be closer together than if the numeral of the tab 3ª were at the right, and therefore, to file in the wrong place it would become necessary to file against the wrong number and consequently in the wrong sub-division. This provides means whereby the alphabetical arrangement checks the numerical, and the numerical arrangement checks the alphabetical. Other folders 4, having tabs 4ª, may be employed for miscellaneous correspondence or subjects, and the number of these folders required for a complete set will always be the same as the number of the guides 2. The tabs of these folders 4 are printed the same as the tabs 2ª, and consequently the numerals of the tabs 3ª of folders 3 would always be next adjacent to the numerals of the tabs 2ª or 4ª. The bodies of these folders 4 are preferably printed with the same total sub-divisions of the complete alphabet, as the guides 1 and 2 and the folders 3. Preferably they are cut with their tabs in what I refer to as third position, said position being indicated in Fig. 2. I prefer that the tabs 4ª shall be printed in a distinctive color such as red so that these miscellaneous folders 4 will be distinctive from any of the other folders or guides in the drawer, thereby facilitating both reference and filing. As shown by comparing Figs. 1 and 2, the preferable arrangement is such that the projections or tabs 2ª of the subdivisional guides are in the second position and bear both an alphabetical subdivision and its number, and that the projections or tabs 4ª of the miscellaneous folders are in the 3rd position and bear exactly the same designations. Furthermore, that the so-called active folders 3 with wide projections in the 4th position, are filed between the subdivisional guides 2 and the miscellaneous folders 4 referred to, and that the said projections or tabs 3ª are adjacent to the projections or tabs 4ª.

At the extreme left of the tab 3ª of the so-called active folder, appears the number representing the subdivision that the name of the correspondence or subjects falls in, and this folder is filed between the sub-divisional guide 2 having the same number and the miscellaneous folder 4 bearing the same number alphabetized so far as arrangement is concerned with other folders between the same divisions. To file one of the so-called active folders wrong, it becomes necessary to file against the wrong number, as well as against the wrong alphabetical subdivision; that is, incorrect filing would immediately show two closely adjacent numbers not corresponding, and also non-corresponding alphabetical sub-divisions not far apart. If, through gross carelessness, a so-called active folder is misfiled, it is easily located because of the fact that the projection bearing the number at the extreme left adjacent to a folder bearing the number at the extreme right must conform and if it does not, the folder is misfiled.

All of the guides and folders are, of course, of substantially the same height in order that their tabs may be instantly examined for the purposes described.

Divisional guides 5 having tabs 5ª are shown in Figs. 1 and 2. These guides are preferably printed with the same alphabetical divisions as the guides 1 and 2 and the folders 3 and 4, each alphabetical division having its own numeral. Their tabs may be printed or written upon with the names of salesmen such as "A. H. Adams", branch offices such as the name of a State or city, or the names of months, or the names of special subjects such as "Accounting" or "Stock". I have shown the tabs 5ª as integral with the guides themselves, but obviously these guides 5 may bear or carry any kind of a projection for reference. For instance, metal holders for the accommodation of removable labels are well known and could be used with these guides. The preferred location for the tabs 5ª is at the extreme right or fifth position. These divisional guides 5 provide for geographical, subject, or date divisions, without interfering in any way with any of the other folders or guides, thereby facilitating rapid filing and reference, and eliminating the possibility of error.

Cross index cards may be employed, such as shown at 6, the minimum number of these cards required for a set being the same as the guides 1 for the main divisions of the alphabet. Their tabs 6ª will be printed with the main divisions of the alphabet, and the face of each is printed with a form to take care of all of the cross indexing under one letter of the alphabet. These cards are preferably so cut that their tabs 6ª occupy the fifth position, but I do not limit myself, of course, to the particular position of the tabs.

Guides 7 for the charging of correspondence which is removed from the file have tabs 7ª which are shown as occupying the first position, that is in between the front and rear tabs 1ª. The body of each guide 7 is printed with a form which will permit charging correspondence as it is removed from the file and crediting the same when returned.

Among the advantages possessed by this system are the following:—As the tabs of the guides 1 and 2 are in different positions, but close together and at the left, the tabs 5ª of the subject guides 5 cannot interfere with the names written on the tabs of the permanent correspondence folders 3. The alphabetical miscellaneous folders 4 take care of miscellaneous correspondence without being cumbersome, or causing confusion or waste of time in handling the other correspondence; and by means of said folders 4 the miscellaneous correspondence is distributed throughout the entire file in proper alphabetical sequence. The main guides 1 are distinguished from each other by the main divisions of the alphabet, as by the 26 letters of the alphabet, one on each tab 1ª in the embodiment of the invention illustrated. And since all are otherwise uniformly printed with sub-divisions of the complete alphabet, each of which subdivisions has its own numeral, it makes no difference at what portion of the set a person is working, as to the quickness with which the next place for reference or filing can be found.

This alphabetical-numerical system is adapted to the filing of credit reports, shipping receipts, production orders, and all classes of cards or papers, although the miscellaneous folders 4 will be required only where there are miscellaneous and transient matters to be taken care of.

It may be mentioned at this point that the folders 3 and 4 may be, if required, of the bellows or gusset type.

Referring now to Figs. 3, 4, and 5, which illustrate the invention adapted for an alphabetical-numerical card ledger, the main guides 10 having tabs 10ª bear sub-divisions of the alphabet, practically the same as in Fig. 1 of the drawings. In the embodiment illustrated in Figs. 3, 4, and 5, the sub-dividing of the alphabet is shown in two sets, dividing the entire alphabet into two halves. The members of the set illustrated in Fig. 3 are printed with the first half of the alphabet from A to L and their sub-divisions; it being understood, of course, that the second half of the entire set would be printed with the other half of the alphabet from M to Z. This division of the alphabet into two halves is simply because of the relatively small size of the cards. Cards of the usual size employed and which are preferably for card ledger systems, are usually too small to bear such an extensive sub-division of the alphabet as shown in Fig. 1. In an embodiment of the invention as a card ledger system, the guides 10 make the main divisions of the alphabet, A, B, C, etc., and there will be 24 or 26 of them to comprise a complete set from A to Z. Each sub-division is assigned an arbitrary number, beginning with 1 and running in sequence. These guides are preferably cut with tabs 10ª in the center position, but I do not limit myself to this position for the tabs. The guides 20 for marking the sub-divisions of the alphabet are provided with tabs 20ª which preferably have their tabs at the extreme left, or what I refer to as the first position. 30 represent the ledger cards, and the number of these required for an outfit is governed by the number of different accounts, with a reasonable allowance for active and new accounts. These ledger cards 30 are preferably cut with shoulder tabs 30ª, and at their extreme left are printed sub-divisions of the alphabet the sub-divisions having the same numerical designations as the main and sub-guides 10 and 20. Folders 13 may be employyed in connection with the ledger cards, as illustrated in Fig. 5 of the drawings, and the front leaves of said folders have the same numerically indicated sub-divisions of the alphabet as the guides 10 and 20.

Any particular style of monthly bill forms may be employed and it need not be described herein, especially, since the system might be applied to use for stock records or for card systems in general.

By comparing Figs. 1, 2 and 3, it will be readily understood that the two embodiments or uses of the invention are related, because it makes it possible to use the same numeral for the correspondence as for the accounts receivable, accounts payable, credits, etc., without complicating matters. For instance, all correspondence with any one by the name of Badger would be located in sub-division 4, and all matters relating to accounts of the same party would go in sub-division 4 of the card ledger system. And no matter where a person is working, if his next location for reference or filing is elsewhere, he can instantly find the proper number in front of him at the place where he is working, without having to run over a large number of cards or guides to gradually lead up to the next place for reference or filing.

I claim:—

1. A filing system having a series of guides, each guide bearing uniform sub-divisions of the complete alphabet, each of which sub-divisions has also a distinct number of its own, the guides being distinguished from each other by main divisions of the alphabet.

2. A filing system having a series of guides bearing uniform alphabetical sub-divisions, each of which sub-divisions has also a distinct number of its own, the guides being distinguished from each other by main divisions of the alphabet, and a series of guides having the same alphabetical and numeral sub-divisions and distinguished from each other by sub-divisions of the alphabet acording to the sub-divisions borne by the main guides.

3. A filing system having a series of guides bearing uniform complete alphabetical sub-divisions which are individualized by numerals, said guides having projections to stand one behind another, each projection bearing one of the alphabetical numerical sub-divisions, and a series of folders having projections to stand one behind another in a row parallel with and adjacent to those of the guides and bearing alphabetical numerical sub-divisions corresponding with those of the guides, whereby misfiling may be readily prevented or detected when made.

4. A filing system having a series of guides bearing uniform alphabetical sub-divisions, each of which sub-divisions has also a distinct number of its own, the guides being distingusihed from each other by main divisions of the alphabet, a series of guides having the same alphabetical and numerical sub-divisions and distinguished from each other by sub-divisions of the alphabet according to the sub-divisions borne by the main guides, and two separate sets of folders for active and miscellaneous correspondence. or subjects, said folders having the same alphabetical-numerical sub-divisions as the guides.

5. A filing system having a series of guides bearing uniform alphabetical sub-divisions, each of which sub-divisions has also a distinct number of its own, the guides being distinguished from each other by main divisions of the alphabet, a series of guides having the same alphabetical and numeral sub-divisions and distinguished from each other by sub-divisions of the alphabet according to the sub-divisions borne by the main guides, the main guides and the sub-divisions having tabs in different positions.

6. A filing system having a series of guides bearing uniform complete alphabetical sub-divisions which are individualized by numerals, said guides having projections to stand one behind another, each projection bearing one of the alphabetical numerical sub-divisions, and a series of folders having projections to stand one behind another in a row parallel with and adjacent to those of the guides and bearing alphabetical numerical sub-divisions corresponding with those of the guides, the numerals of the guide projections being at the right and those of the folder projections at the left.

In testimony whereof I have affixed my signature, in presence of two witnesses.

EDWARD A. DUNN.

Witnesses:
C. F. BROWN,
P. W. PEZZETTI.